Jan. 28, 1958  G. E. HUGHES  2,821,674
MOTOR CONTROL CIRCUITS
Filed July 8, 1954
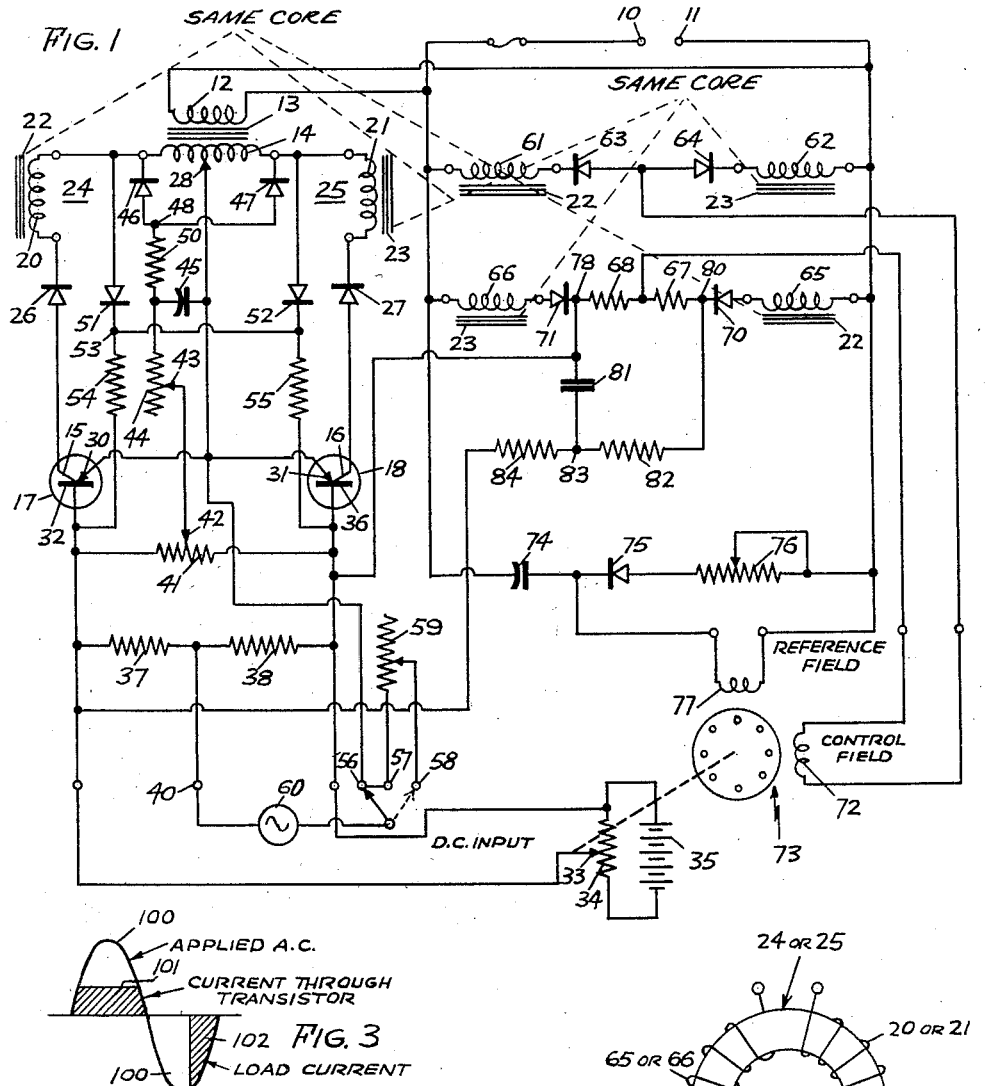
FIG. 1
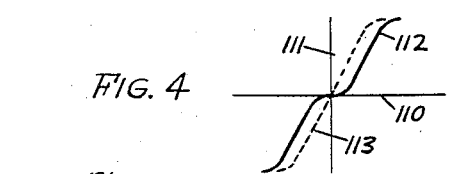
FIG. 3
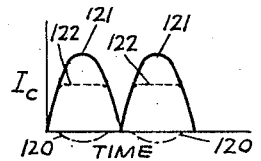
FIG. 4
FIG. 5
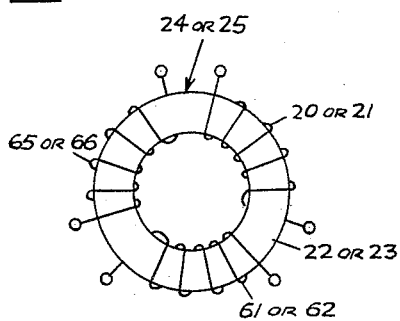
FIG. 2
INVENTOR
GERALD E. HUGHES
BY Elmer J. Gorn
ATTORNEY United States Patent Office 2,821,674
Patented Jan. 28, 1958

2,821,674
MOTOR CONTROL CIRCUITS

Gerald E. Hughes, Waltham, Mass., assignor to Raytheon Manufacturing Company, Waltham, Mass., a corporation of Delaware Application July 8, 1954, Serial No. 441,977

6 Claims. (Cl. 318—220)

This invention relates to motor control circuits, and more particularly to control circuits for motors of the split phase induction type as used in servo systems, and to systems for controlling the voltages supplied to the reference and control windings of such motors.

Split phase induction motors have been found useful for controlling the angular position of a shaft. However, in many other systems in which such a motor would be useful, the presence of shock and vibration make the use of thermionic tubes undesirable, yet space and weight are at a premium. The circuit of the invention permits the use of magnetic amplifiers and transistors that are not vulnerable to shock and vibration in such applications to provide a control circuit with a minimum of bulk and weight for the power required.

These objects are accomplished in the present invention by using a pair of transistors connected in grounded emitter circuits to control the flow of pulsed direct current through the saturating windings of associated magnetic amplifiers which, in turn, control the flow of alternating current through the control winding of a split phase induction motor. A portion of the current flowing in the control windings is used to develop a voltage between the base and emitter of each transistor in such a manner as to counteract excessive changes in the current flowing through the control winding. Both a fixed direct current and a fixed alternating current are applied to a reference field winding. The direct current used for this purpose provides the equivalent of viscous damping. The result is a control circuit that starts to correct the position of a shaft within a half cycle of the supply voltage.

The foregoing and other advantages of this invention will be better understood from the following description taken in conjunction with the accompanying drawings wherein:

Fig. 1 is a schematic diagram of the circuit of the invention;

Fig. 2 is a schematic diagram of the various windings on the cores of the magnetic amplifiers used in the circuit of Fig. 1;

Fig. 3 is a voltage-time graph of the voltage applied to the magnetic amplifiers, the current through the transistors, and the resulting current through the load;

Fig. 4 is a graph of the angular displacement torque of the shaft with respect to applied control voltage; and Fig. 5 is a graph of the variation of the current through one of the transistors with respect to time and illustrates the operation of one corrective circuit of the invention.

In Fig. 1, a source of alternating current is connected across terminals 10 and 11 which in turn are connected to the primary winding 12 of a transformer 13. Each terminal of the secondary winding 14 of the transformer 13 is connected to the collector 15 or 16 of transistors 17 and 18, respectively, through the saturating windings 20 and 21 on the cores 22 and 23 of magnetic amplifiers 24 and 25 and rectifiers 26 and 27.

Each of the cores 22 and 23 carries three windings 20, 61 and 65 and 21, 62 and 66, respectively, as shown in Fig. 2. In the interests of clarity each core 22 and 23 is shown separated into three parts associated with the three windings. However, it is to be understood that the three elements labelled 22 in Fig. 1 are a single core as shown in Fig. 2 and likewise the three elements labelled 23 in Fig. 1 are a single core also as shown in Fig. 2. A center tap 28 on the secondary 14 of the transformer 13 is connected to the emitters 30 and 31 of the transistors 17 and 18. The base 32 of the transistor 17 is connected to the arm 33 of a potentiometer 34 connected across a source 35 of direct current potential. The base 36 of the transistor 18 is connected to one terminal of the potentiometer 34 and to one terminal of the source 35 of direct current potential. A pair of resistors 37 and 38 is connected in series between the bases 32 and 36 connected in opposing polarity between the terminals 10 and 11. The control field winding 72 on the two-phase induction motor 73, preferably of the squirrel cage type, is connected between the junction points of the rectifiers 63 and 64 on the one side and resistors 67 and 68 on the other side. A capacitor 74, a rectifier 75, and a variable resistor 76 are connected in series between the terminals 10 and 11. The reference field 77 of the motor 73 is connected across the variable resistor 76 and the rectifier 75. The connecting point 78 between the resistor 68 and the rectifier 71 is connected to the base 36 of the transistor 18. The junction point 78 is coupled to the junction point 80 between the resistor 67 and the rectifier 70 through capacitor 81 and resistor 82. The junction point 83 between the resistor 82 and the capacitor 81 is connected to the base 32 of transistor 17 through resistor 84.

In operation, alternating current from across the terminals 10 and 11 is applied to the primary winding 12 of the transformer 13, as shown by the sine wave 100 in Fig. 3. The A. C. voltage appearing across the secondary 14 of the transformer 13 is rectified in the full wave rectifier formed by the two rectifiers 46 and 47 and filtered in the filter formed by the resistor 50 and the capacitor 45 and is applied through a current limiting resistor 44 and a balancing potentiometer 41 to supply a fixed D. C. bias. An additional D. C. potential is applied from the potentiometer 34 driven by the shaft of the motor 73 that is to be controlled. An alternating current voltage is supplied from a source 60 that is in series with the base and emitter of each of transistors 17 and 18. The source may be a servo generator driven by the shaft of the motor 73. The result is that on alternate cycles each transistor conducts with a collector current of a duration and amplitude indicated by the shaded area 101, in Fig. 3. The result is to saturate the cores 22 and 23 alternately for a portion of each cycle of the applied A. C. voltage. As a result current flows in either windings 61 and 65 on core 22 or in windings 62 and 66 on core 23 for a period in each cycle represented by the area 102 in the graph of Fig. 3. When current flows through windings 61 and 65, current also flows through the control field 72 in a direction to turn the motor in one direction. When current flows through the windings 62 and 66, current flows through the control field winding 72 in a direction such as to turn the motor in the opposite direction. By the proper adjustment of the fixed A. C. and D. C. voltages applied to the transistors 17 and 18, no voltage will be applied to the control field of the motor and it will remain stationary at the predetermined position. Any displacement of the shaft from this predetermined position changes the voltage applied by the potentiometer 34 and by the alternating current source 60 to the base emitter circuits of the transistors so as to cause one or the other of the transistors to conduct and saturate its associated core 22 or 23 to cause a current of the appropriate polarity to flow through the control field 72 to return the motor to the predetermined position.

With the circuits so far described, the control has a characteristic curve such as that shown in Fig. 4 in which the applied controlled voltage is plotted horizontally along the line 110 and the developed displacement torque along the vertical line 111 to give the curve 112. It will be noted that this curve flattens as it passes through the origin. This is undesirable. It is due to the fact that the pulses of energy applied to the emitter-to-base circuits of the transistors 17 and 18 are substantially rectified sine waves. Such pulse inputs do not take full advantage of the substantially rectangular hysteresis loop of cores now available for magnetic amplifiers. Such cores give better performance when supplied with rectangular pulses. Such rectangular pulses are obtained by means of the rectifiers 51 and 52 connected across the secondary 14 of the transformer 13. Each of these rectifiers is connected to the base 32 or 36 of one of the transistors through a resistor 54 or 55, respectively, to produce parts of rectified sine waves having the shape shown in the curves 120 of Fig. 5 that are in phase opposition to the rectified sine waves 121 applied to the bases 32 and 36. The result is to flatten out the tops of waves 121 to form substantially rectangular pulses 122. This gives the smoother characteristic curve 113 of Fig. 4 where the linear portion of the curve continues through the origin.

A D. C. voltage developed across resistors 67 and 68 is proportional to the control field current and is applied to the bases 32 and 36 through a filter comprising capacitor 81 and resistors 82 and 84 to produce a negative feedback voltage that serves to decrease the gain of the amplifier when the control field current is higher than a predetermined minimum value. This feedback voltage serves to stabilize the operation of the servo amplifier.

A portion of the alternating current supply from terminals 10 and 11 is applied after being shifted in phase through a capacitor 74 to the reference field winding 77. A portion of this current is also rectified by the rectifier 75 and also applied to the reference field winding 77. This direct current supplies a stationary magnetic field to the motor. This field produces a damping action on the control motor similar to viscous damping. This damping stabilizes the servo system without introducing torque chatter as would be the case were a damping current applied to the control field winding of such a motor.

A single load winding 61 or 65 and 62 or 66 could be used on each core 22 or 23 but the result would be a jerking motion of the shaft if more than a cycle of the supply current were required to reposition the shaft. This jerking motion is due to the counter E. M. F. built up by the control winding which, when the current ceases to flow through the load winding, will flow in the opposite direction through the field winding. This reversed current has a braking action on the rotor of the motor causing it to stop between impulses received from the load winding. When two windings on each core are used with associated rectifiers, a current is set up in the control field by the second winding that opposes the counter E. M. F. mentioned above and permits the shaft to rotate to the correct position smoothly.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A control circuit comprising two outputs and three inputs, magnetic amplifier means under control of a direct current adapted to control the amount of an alternating current potential applied to a first of said inputs that is applied to a first of said outputs, transistor means controlling the amount of direct current supplied to said magnetic amplifier means, means for applying alternating current and a varying direct current to the input of said transistor to control the amount of direct current applied to the magnetic amplifier means, means to apply a fixed alternating voltage and a fixed direct current to the second output and means to apply a unidirectional voltage proportional to the current flowing through the first output in such polarity as to counteract any variation in said current in excess of a predetermined value comprising two windings, one on each magnetic amplifier connected in series with a pair of rectifiers connected in opposing polarity, and a pair of resistors across the source of alternating current, the two resistors of the said circuit being connected between the bases of the transistors through a filter circuit.

2. A control circuit comprising two outputs and three inputs, magnetic amplifier means under control of a direct current adapted to control the amount of an alternating current potential applied to a first of said inputs that is applied to a first of said outputs, transistor means having an emitter, a collector and a base connected in a grounded emitter circuit controlling the amount of direct current supplied to said magnetic amplifier means, means for applying alternating current and a varying direct current between the emitter and base of said transistor means to control the amount of direct current applied to the magnetic amplifier means, means to apply a fixed alternating voltage and a fixed direct current to the second output, and means to apply a unidirectional voltage proportional to the current flowing through the first output in such polarity as to counteract any variation in said current in excess of a predetermined value comprising two windings, one on each magnetic amplifier connected in series with a pair of rectifiers connected in opposing polarity, and a pair of resistors across the source of alternating current, the two resistors of the said circuit being connected between the bases of the transistors through a filter circuit.

3. A control circuit comprising two outputs and three inputs, magnetic amplifier means under control of a direct current adapted to control the amount of an alternating current potential applied to a first of said inputs that is applied to a first of said outputs, transistor means controlling the amount of direct current supplied to said magnetic amplifier means, means for applying alternating current and a varying direct current of said transistor means to control the amount of direct current applied to the magnetic amplifier means, means to apply a fixed alternating voltage and a fixed direct current to the second output comprising a capacitor, a rectifier and a resistor in series across the source of alternating current with said rectifier and resistor connected in series across the second output, and means to apply a unidirectional voltage proportional to the current flowing through the first output in such polarity as to counteract any variation in said current in excess of a predetermined value comprising two windings, one on each magnetic amplifier connected in series with a pair of rectifiers connected in opposing polarity, and a pair of resistors across the source of alternating current, the two resistors of the said circuit being connected between the bases of the transistors through a filter circuit.

4. A control circuit comprising two outputs and three inputs, magnetic amplifier means under control of a direct current adapted to control the amount of an alternating current potential applied to a first of said inputs that is applied to a first of said outputs, transistor means having an emitter, a collector, and a base connected in a grounded emitter circuit controlling the amount of direct current applied to said magnetic amplifier means, means for applying alternating current and a varying direct current between the emitter and base of said transistor means to control the amount of direct current applied to the magnetic amplifier means, means to apply a fixed alternating voltage and a fixed direct current to the second output comprising a capacitor, a rectifier and a resistor in series across the source of alternating current with said rectifier and resistor connected in series across the second output and means to apply a unidirectional voltage proportional to the current flowing through the first output in such polarity as to counteract any variation in said current in excess of a predetermined value comprising two windings, one on each magnetic amplifier connected in series with a pair of rectifiers connected in opposing polarity, and a pair of resistors across the source of alternating current, the two resistors of the said circuit being connected between the bases of the transistors through a filter circuit.

5. A motor control circuit comprising a two-phase motor having two separate field windings, a source of alternating current potential, magnetic amplifier means under control of a source of direct current for controlling the amount of said alternating current potential applied to one of said field windings, transistor means controlling the amount of direct current supplied to said magnetic amplifier means, a source of alternating current and a varying source of direct current applied to the input of said transistor to control the amount of direct current it applies to the magnetic amplifier means, means to apply a fixed alternating voltage and a fixed direct current to the second fixed winding and means to apply a unidirectional voltage proportional to the current flowing through the first field winding in such polarity as to counteract any variation in excess of a predetermined amount from a predetermined value comprising two windings, one on each magnetic amplifier connected in series with a pair of rectifiers connected in opposing polarity, and a pair of resistors across the source of alternating current, the two resistors of said circuit being connected between the bases of the transistors through a filter circuit.

6. A motor control circuit comprising a two-phase motor having two separate field windings, a source of alternating current potential, magnetic amplifier means under control of a source of direct current for controlling the amount of said alternating current potential applied to one of said field windings, transistor means having an emitter, a collector and base connected in a grounded emitter circuit controlling the amount of direct current supplied to said magnetic amplifier means, a source of alternating current and a varying source of direct current applied between the emitter and base of said transistor to control the amount of direct current it applies to the magnetic amplifier means, means to apply a fixed alternating voltage and a fixed direct current to the second field winding comprising a capacitor, a rectifier and a resistor in series across the source of alternating current with said rectifier and resistor connected in series across the second field winding, and means to apply a unidirectional voltage proportional to the current flowing through the first field winding in such polarity as to counteract any variation in excess of a predetermined amount from a predetermined value comprising two windings, one on each magnetic amplifier connected in series with a pair of rectifiers connected in opposing polarity, and a pair of resistors across the source of alternating current, the two resistors of the said circuit being connected between the bases of the transistors through a filter circuit.

References Cited in the file of this patent

UNITED STATES PATENTS

| | | |
|---|---|---|
| 2,450,084 | Emerson | Sept. 28, 1948 |
| 2,508,082 | Wald | May 16, 1950 |
| 2,519,043 | Greenwood et al. | Aug. 15, 1950 |
| 2,653,282 | Darling | Sept. 22, 1953 |
| 2,677,796 | Geyger | May 4, 1954 |
| 2,683,843 | Geyger | July 13, 1954 |

OTHER REFERENCES

"Electronics," August 1953, pp. 136–140.